United States Patent
Kondo (10) Patent No.: US 8,299,414 B2
(45) Date of Patent: Oct. 30, 2012

(54) SOLID-STATE IMAGING DEVICE

(75) Inventor: Toru Kondo, Tokyo (JP)

(73) Assignee: Olympus Corporation, Tokyo (JP)

( * ) Notice: Subject to any disclaimer, the term of this patent is extended or adjusted under 35 U.S.C. 154(b) by 233 days.

(21) Appl. No.: 12/643,354

(22) Filed: Dec. 21, 2009

(65) Prior Publication Data

US 2010/0163711 A1    Jul. 1, 2010

(30) Foreign Application Priority Data

Dec. 26, 2008   (JP) .................. 2008-333577

(51) Int. Cl.
*H01L 27/00* (2006.01)
*H01L 31/00* (2006.01)
*H03K 17/78* (2006.01)
*H04N 3/14* (2006.01)

(52) U.S. Cl. ............... 250/208.1; 250/214.1; 348/300

(58) Field of Classification Search ............ 250/208.1, 250/214 R, 214.1, 214 A, 214 LS, 214 SW, 250/216; 348/296, 308, 311, 312, 300, 301, 348/302, 307, 309; 396/168; 327/50

See application file for complete search history.

(56) References Cited

U.S. PATENT DOCUMENTS

| | | | |
|---|---|---|---|
| 7,315,330 B2 * | 1/2008 | Hamasaki | 348/314 |
| 7,567,280 B2 * | 7/2009 | Muramatsu et al. | 348/294 |
| 7,948,542 B2 * | 5/2011 | Joshi et al. | 348/301 |
| 2009/0218476 A1 * | 9/2009 | Kameshima et al. | 250/208.1 |

FOREIGN PATENT DOCUMENTS

JP    2006-93816 A    4/2006

* cited by examiner

*Primary Examiner* — Georgia Epps
*Assistant Examiner* — Don Williams
(74) *Attorney, Agent, or Firm* — Westerman, Hattori, Daniels & Adrian, LLP (57) ABSTRACT

A solid-state imaging device comprises pixel units, column signal lines, column circuits, a switching unit, and a mode control unit. Pixel units are two-dimensionally disposed in a matrix direction, and each of them comprises a photoelectric conversion unit and an amplifying unit. Column signal lines are provided for each column and the pixel signals from the amplifying units are output to each of rows. Column circuits are provided for each column and process signals from the column signal lines. A switching unit switches connection between the column signal lines and the column circuits. A mode control unit outputs signals to the switching unit and controls switching between a first mode in which the column signal lines are connected to the column circuits on the same column thereof and a second mode in which the column signal lines are connected to the column circuits on another column.

6 Claims, 9 Drawing Sheets

SOLID-STATE IMAGING DEVICE

BACKGROUND OF THE INVENTION

1. Field of the Invention

The present invention relates to a solid-state imaging device which can switch reading modes between an all pixel reading mode and a column thinning-out reading mode.

Priority is claimed on Japanese Patent Application No. 2008-333577, filed Dec. 26, 2008, the content of which is incorporated herein by reference.

2. Description of Related Art

As a solid-state imaging device used as an imaging device in an imaging device which converts light into electric signals and outputs image signals such as a digital still camera, a variety of research and development has been made regarding a MOS (Metal-Oxide Semiconductor) type solid-state imaging device (for example, see Japanese Unexamined Patent Application, First Publication No. 2006-93816 for reference).

Figure 8:
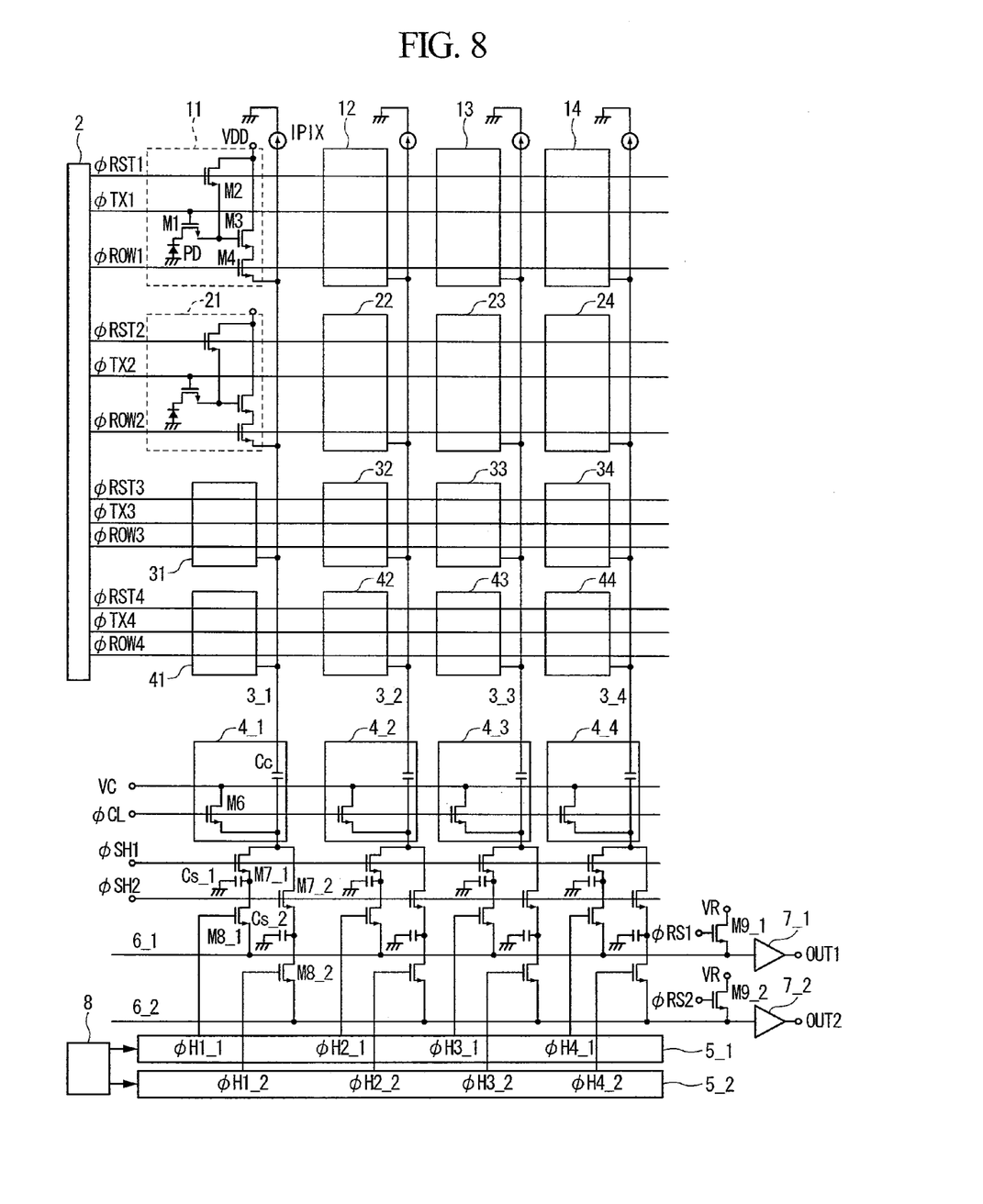
FIG. 8 is a block diagram illustrating a configuration of a solid-state imaging device of an embodiment according to the related art.

For example, FIG. 8 shows a configuration of the MOS type solid-state imaging device according to the related art as an example, which can be operated in the all pixel reading mode or in the column thinning-out reading mode by switching therebetween.

The MOS type solid-state imaging device is constituted by pixel units 11 to 44 which are arranged in a matrix shape, a vertical scanning unit 2 which supplies reading pulses to the pixel units 11 to 44, vertical signal lines 3_1 to 3_4 which transmit signals from the pixel units 11 to 44, and a pixel bias current source IPIX which supplies a constant current to the vertical signal lines 3_1 to 3_4. The MOS type solid-state imaging device is constituted by column circuits 4_1 to 4_4 which process the signals of the vertical signal lines 3_1 to 3_4, sample-and-hold transistors M7_1 and M7_2 which are connected to each column circuit to hold signals from the column circuits, sample-and-hold capacitances Cs_1 and Cs_2, column selection transistors M8_1 and M8_2 which selectively output signals to horizontal signal lines 6_1 and 6_2 from the sample-and-hold capacitances Cs_1 and Cs_2 of each column, and horizontal scanning units 5_1 and 5_2 which supply pulses to the column selection transistors M8_1 and M8_2. The MOS type solid-state imaging device is constituted by horizontal signal line reset transistors M9_1 and M9_2 which reset the horizontal signal lines 6_1 and 6_2, output amplifiers 7_1 and 7_2 which amplify and output the signals of the horizontal signal lines 6_1 and 6_2, and a mode setting unit 8 which switches reading modes.

Each of the pixel units 11 to 44 is constituted by a photodiode PD which converts incident light into an electric signal, a transmission transistor M1 which transmits the electric signal stored in the photodiode PD, an amplifying transistor M3 which amplifies the transmitted electric signal, a reset transistor M2 which resets a potential of a gate of the amplifying transistor M3, and a row selection transistor M4 which selectively outputs an amplified signal based on the electric signal.

In the gates of the transmission transistor M1, the reset transistor M2, and the row selection transistor M4, transmission pulses φTX1 to φTX4, reset pulses φRST1 to φRST4, and row selection pulses φROW1 to φROW4 are input from the vertical scanning unit 2. In addition, a pixel power source VDD is connected to the drains of the reset transistor M2 and the amplifying transistor M3.

Each of the row circuits 4_1 to 4_4 is constituted by a clamp capacitance Cc and a clamp transistor M6 in order to clamp the output signal of each of the pixel units 11 to 44 on a clamp potential VC, so that the noise components included in the pixel signals are reduced. A clamp pulse φCL is input to the gate of the clamp transistor M6.

In addition, a sample-and-hold pulse φSH1 is input to the gates of the sample-and-hold transistors M7_1. A sample-and-hold pulse φSH2 is input to the gates of the sample-and-hold transistors M7_2.

The column selection pulses φH1_1 to φH4_1 are input to the gates of the column selection transistors M8_1 of the respective columns. The column selection pulses φH1_2 to φH4_2 are input to the gates of the column selection transistors M8_2 of the respective columns. The horizontal signal line reset pulses φRS1 and φRS2 are input to the gates of the horizontal signal line reset transistors M9_1 and M9_2. A horizontal signal line reset voltage source VR is connected to the drains of the horizontal signal line reset transistors M9_1 and M9_2.

Using the timing chart shown in FIG. 9, the outline of the operations of the MOS type solid-state imaging device according to the related art shown in FIG. 8 will be described. Further, in the following description, a high level of a voltage is expressed by "H" level, and a low level thereof is expressed by "L" level.

Figure 9:
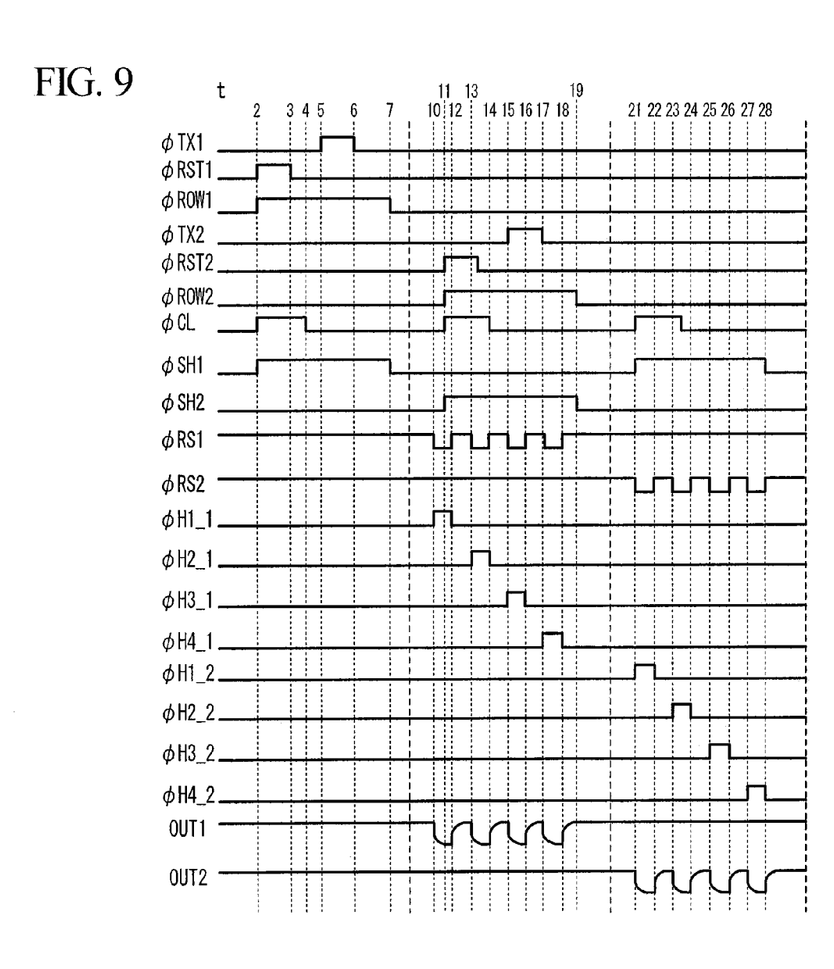
FIG. 9 is a timing chart of an embodiment according to the related art.

FIG. 9 is a timing chart of the all pixel reading mode in which the signals are read from all of the pixels.

First, a reading operation becomes possible to be performed on the pixel units 11 to 14 in a first row by the vertical scanning unit 2. When the row selection pulse φROW1 ascends to the H level, the row selection transistors M4 come to be in the ON state. The output signals of the amplifying transistors M3 are output to the vertical signal lines 3_1 to 3_4, respectively. In addition, when the reset pulse φRST1 ascends to the H level, the reset transistors M2 come to be in the ON state. The gates of the amplifying transistors M3 are reset to a reset potential. The output signals corresponding to the reset potential of the pixel units 11 to 14 are output to the vertical signal lines 3_1 to 3_4, respectively. At this time, the clamp pulse φCL ascends to the H level, so that the clamp transistors M6 come to be the ON state and the clamp capacitances Cc are clamped on a clamp potential VC. In addition, when the sample-and-hold pulse φSH1 ascends to the H level, the sample-and-hold transistors M7_1 come to be in the ON state, so that the sample-and-hold capacitances Cs_1 come to be in a sampling state (see time t2).

Next, after the reset pulse φRST1 descends to the L level (see time t3), the clamp pulse φCL descends to the L level and the clamping is ended (see time t4). In addition, the transmission pulse φTX1 ascends to the H level, so that the transmission transistors M1 come to be in the ON state. The electric signals according to the light signals generated by the photodiodes PD are transmitted to the amplifying transistors M3 (see time t5). The transmission pulse φTX1 descends to the L level. Therefore, the amplified signals of the electric signals according to the light signals of the pixel units are output to the vertical signal lines 3_1 to 3_4. The output signals of the column circuits 4_1 to 4_4 are changed by amounts ΔSig which is caused by the electric signals according to the light signals from the reset potential of the pixel units 11 to 14 due to the clamp capacitances Cc. The noise components included in the reset potential are reduced (see time t6).

When the sample-and-hold pulse φSH1 descends to the L level, the read signals from the column circuits 4_1 to 4_4 are held on the sample-and-hold capacitances Cs_1 of the respective columns (see time t7).

Next, when the horizontal signal line reset pulse φRS1 ascends to the H level, the horizontal signal line 6_1 is reset to the potential of the horizontal signal line reset voltage source VR. Thereafter, when the horizontal signal line reset pulse φRS1 descends to the L level and the column selection pulse φH1_1 ascends to the H level, the output signal of the column circuit 4_1 which is held on the sample-and-hold capacitance Cs_1 is read out to the horizontal signal line 6_1 (see time t10).

The reset operation in which the potential of the horizontal signal line 6_1 becomes the potential of the horizontal signal line reset voltage source VR, and the reading operation of the signals which are held on the sample-and-hold capacitances Cs_1 are repeated. The signals of the first row which are held on the sample-and-hold capacitances Cs_1 are sequentially read out to the horizontal signal line 6_1. The signals are output from the output channel OUT1 via the output amplifier 7_1.

Furthermore, when the signals of the first row are read out to the horizontal signal line 6_1, the pixel signals of the second row are read out similarly to the first row. Similarly to the first row, the pixel signals of the second row, in which the noise components are canceled via the column circuits, are held on the sample-and-hold capacitances Cs_2. (see time t11 to time t19).

When the reading operation of the pixel signals of the first row which are held on the sample-and-hold capacitances Cs_1 is ended (see time t18), a reading operation is continuously performed in which the pixel signals of the second row held on the capacitances Cs_2 are read out to the horizontal signal line 6_2 (see time t21). The reset operation in which the potential of the horizontal signal line 6_1 becomes the potential of the horizontal signal line reset voltage source VR, and the reading operation of the signals which are held on the sample-and-hold capacitances Cs_1 are repeated. Therefore, the reading operation of the signals is carried out on the pixel units (see time t21 to time t28).

As described above, the reading operation in which the pixel signals of the Nth row are read out to the horizontal signal line, the reading operation in which the pixel signals of the (N+1)th row are read out to the column circuits, and the noise canceling process in the column circuits are simultaneously carried out. Therefore, the reading operations can be rapidly carried out.

SUMMARY OF THE INVENTION

In one aspect of the present invention, there is provided a solid-state imaging device that includes at least: a plurality of pixel units which are two-dimensionally disposed in a matrix direction, and each of which comprises a photoelectric conversion unit and an amplifying unit which amplifies an output of the photoelectric conversion unit and outputs a pixel signal; a plurality of column signal lines which are provided for each column and in which the pixel signals from the amplifying units are output to each of a plurality of rows; a plurality of column circuits which are provided for each column and process signals from the column signal lines; a switching unit which switches connection between the plurality of the column signal lines and the column circuits based on an input signal; and a mode control unit which outputs signals to the switching unit and controls switching between a first mode in which the plurality of the column signal lines are connected to the column circuits on the same column thereof and a second mode in which the plurality of the column signal lines are connected to the column circuits on another column.

Moreover, it is preferable that in the solid-state imaging device, the first mode may be a mode in which the signals from all of the pixel units are input to the column circuits, and the second mode may be a mode in which the signals from the pixel units are thinned out in the unit of the plurality of the columns and input to the column circuits.

Furthermore, it is preferable that in the solid-state imaging device, the switching unit may connect one of the column signal lines disposed on a column of a read pixel to the column circuit disposed on a column of a non-read pixel at the time of the second mode.

Additionally, it is preferable that the solid-state imaging device may further comprise a horizontal scanning unit which sequentially reads a signal from the column circuit, and the horizontal scanning unit may perform the same operation in both the first mode and the second mode.

In addition, it is preferable that the solid-state imaging device may further comprise a horizontal scanning unit which sequentially reads a signal from the column circuit, and the horizontal scanning unit may perform an operation in the first mode which is different from the operation in the second mode.

Besides, it is preferable that in the solid-state imaging device, the pixel units may comprise a selection switch which switches connection with a plurality of vertical signal lines, and may connect a control line which controls the selection switch to the pixel units of the plurality of rows.

BRIEF DESCRIPTION OF THE DRAWINGS

The above features and advantages of the present invention will be more apparent from the following detailed description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, the embodiments of the invention will be described with reference to the drawings. Further, the same components in the following drawings are designated by the same reference numerals, and the description thereof will be omitted. In addition, the same operations in operation drawings are designated by the same time, and the description thereof will be omitted.

First Embodiment

Figure 1:
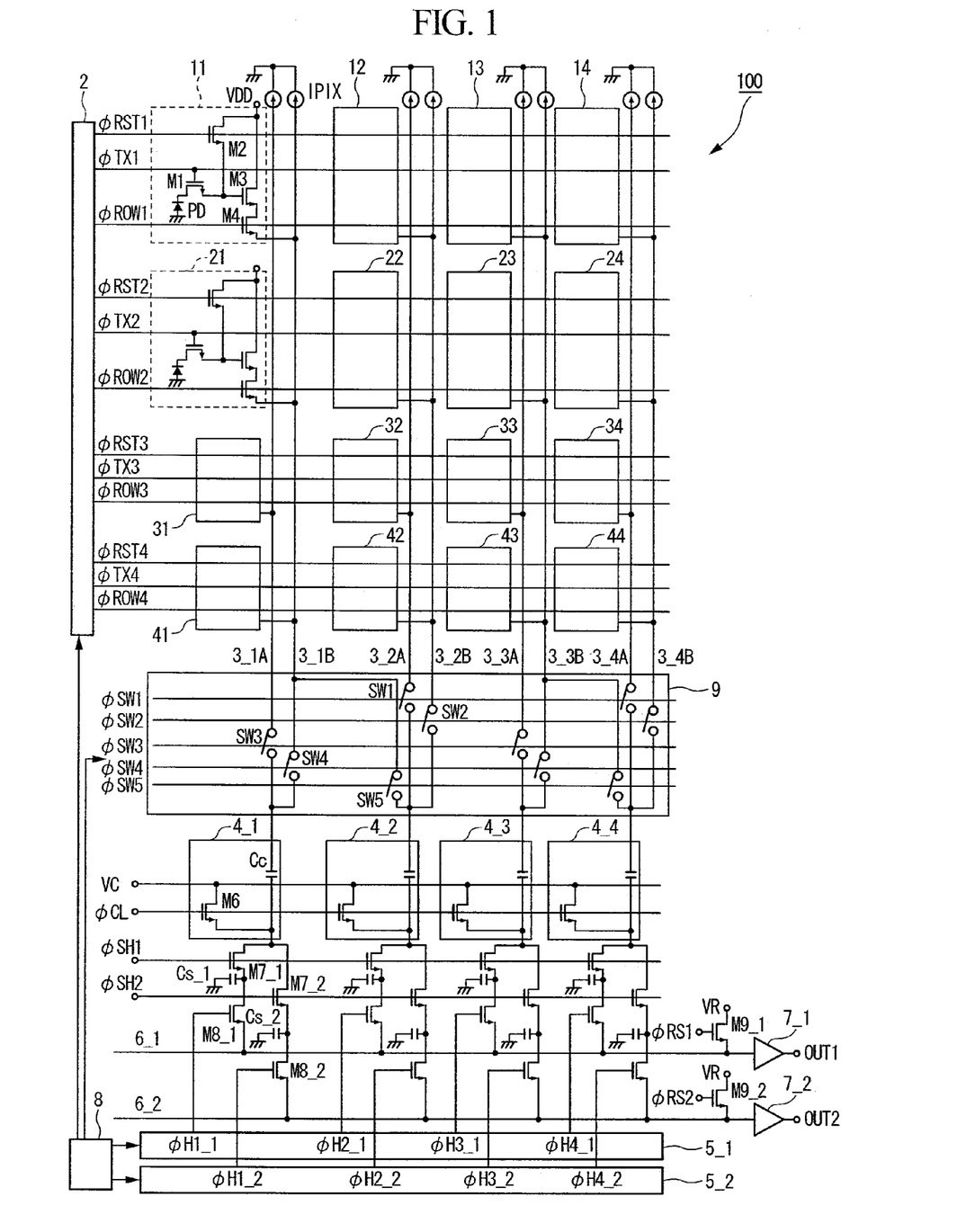
FIG. 1 is a block diagram illustrating a configuration of a solid-state imaging device according to a first embodiment of the present invention.

FIG. 1 is a block diagram schematically illustrating a configuration of the solid-state imaging device according to a first embodiment of the invention.

A solid-state imaging device 100 shown in the drawing is provided with pixel units 11 to 44, a vertical scanning unit 2, vertical signal lines 3_1A and 3_1B to 3_4A and 3_4B, a pixel bias current source IPIX, column circuits 4_1 to 4_4, a connection switching unit 9, sample-and-hold transistors M7_1 and M7_2, sample-and-hold capacitances Cs_1 and Cs_2, column selection transistors M8_1 and M8_2, horizontal scanning units 5_1 and 5_2, horizontal signal line reset transistors M9_1 and M9_2, output amplifiers 7_1 and 7_2, and a mode setting unit 8.

The vertical scanning unit 2 of the solid-state imaging unit 100 supplies a reading pulse to the pixel units 11 to 44.

The vertical signal lines 3_1A and 3_1B to 3_4A and 3_4B transmit the signals which are output from the pixel units 11 to 44.

The pixel bias current source IPIX supplies a constant current to the vertical signal lines 3_1A and 3_1B to 3_4A and 3_4B.

The column circuits 4_1 to 4_4 process the signals which are transmitted from the vertical signal lines 3_1A and 3_1B to 3_4A and 3_4B.

The connection switching unit 9 switches connection between the vertical signal lines 3_1A and 3_1B to 3_4A and 3_4B and the column circuits 4_1 to 4_4.

The sample-and-hold transistors M7_1 and M7_2 are each connected to the column circuits, and connect the respective circuits to the sample-and-hold capacitances Cs_1 and Cs_2. The sample-and-hold capacitances Cs_1 and Cs_2 are charged to potentials represented by the signals from the column circuits. The sample-and-hold transistors M7_1 and M7_2 each disconnect the respective column circuits from the sample-and-hold capacitances Cs_1 and Cs_2. The potentials charged in the sample-and-hold capacitances Cs_1 and Cs_2 are held.

The column selection transistors M8_1 and M8_2 are each connected to the sample-and-hold capacitances Cs_1 and Cs_2 of each column and the horizontal signal lines 6_1 and 6_2. The potentials charged in the respective sample-and-hold capacitances Cs_1 and Cs_2 are selectively output to the horizontal signal lines 6_1 and 6_2.

The horizontal scanning lines 5_1 and 5_2 supply pulses to the column selection transistors M8_1 and M8_2.

The horizontal signal line reset transistors M9_1 and M9_2 reset the potentials of the horizontal signal lines 6_1 and 6_2.

The output amplifiers 7_1 and 7_2 amplify and output the signals from the horizontal signal lines 6_1 and 6_2.

The mode setting unit 8 switches the reading modes.

The pixel units 11 to 44 of the solid-state imaging device 100 are arranged in a matrix shape. Each of the pixel units 11 to 44 is provided with a photodiode PD, a transmission transistor M1, an amplifying transistor M3, a reset transistor M2, and a selection transistor M4.

In each of the pixel units 11 to 44, the photodiode PD converts incident light into an electric signal. The transmission transistor M1 transmits the electric signal which is represented by charges stored in the photodiode PD by the incident light. The amplifying transistor M3 amplifies the transmitted electric signal. The reset transistor M2 resets the potential of the gate of the amplifying transistor M3. The row selection transistor M4 selectively outputs the amplified signals based on the electric signal.

In the gates of the transmission transistor M1, the reset transistor M2, and the row selection transistor M4, transmission pulses φTX1 to φTX4, reset pulses φRST1 to φRST4, and row selection pulses φROW1 to φROW4 which are output from the vertical scanning unit 2 are input. In addition, a pixel power source VDD is connected to the drains of the reset transistor M2 and the amplifying transistor M3.

In addition, the pixel units 11 to 44 are alternately connected to the vertical signal lines 3_1A to 3_4A and 3_1B to 3_4B in every other row.

The column circuits 4_1 to 4_4 of the solid-state imaging device 100 are provided with a clamp capacitance Cc and a clamp transistor M6 for each column circuit.

The clamp transistors M6 of the column circuits 4_1 to 4_4 clamp the output signals from the pixel units 11 to 44 input via the clamp capacitances Cc on a clamp voltage VC. The clamp capacitances Cc perform coupling of the output signals from the pixel units 11 to 44, and remove the noise components included in the pixel signals. In the gates of the clamp transistors M6, the clamp pulse φCL is input.

The connection switching unit 9 of the solid-state imaging device 100 is provided with a switch SW3, a switch SW4, a switch SW1, a switch SW2, and a connection switch SW5.

The switch SW3 of the connection switching unit 9 connects the vertical signal lines 3_1A and 3_3A to the column circuits 4_1 and 4_3. The switch SW4 connects the vertical signal lines 3_1B and 3_3B to the column circuits 4_1 and 4_3. The switch SW1 connects the vertical signal lines 3_2A and 3_4A to the column circuits 4_2 and 4_4. The switch SW2 connects the vertical signal lines 3_2B and 3_4B to the column circuits 4_2 and 4_4. The switch SW5 connects the vertical signal lines 3_1B and 3_3B to the column circuits 4_2 and 4_4. In the switches SW1 to SW5, connection switching pulses φSW1 to φSW5 for switching between the ON state and the OFF state of the switches SW1 to SW5 are input by the mode setting unit.

In addition, a sample-and-hold pulse φSH1 is input to the gates of the sample-and-hold transistors M7_1. A sample-and-hold pulse φSH2 is input to the gates of the sample-and-hold transistors M7_2.

The column selection pulses φH1_1 to φH4_1 are input to the gates of the column selection transistors M8_1 of the respective columns. The column selection pulses φH1_2 to φH4_2 are input to the gates of the column selection transistors M8_2 of the respective columns.

The horizontal signal line reset pulses φRS1 and φRS2 are input to the gates of the horizontal signal line reset transistors M9_1 and M9_2. A horizontal signal line reset voltage source VR is connected to the drains of the horizontal signal line reset transistors M9_1 and M9_2.

Figure 2A:
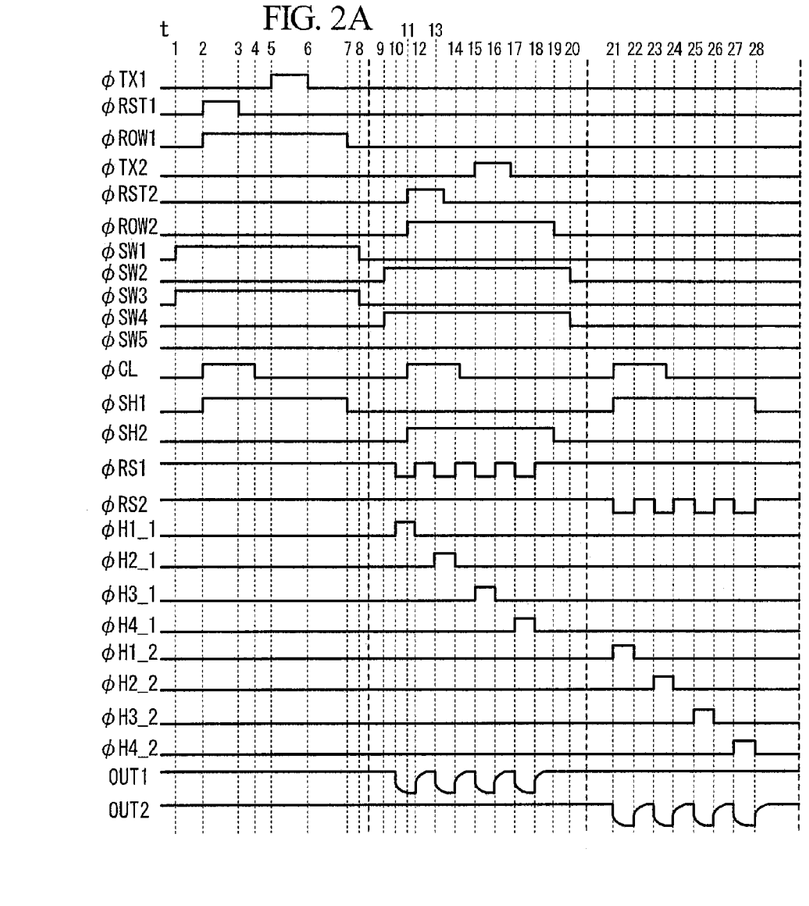
FIGS. 2A and 2B are timing charts according to the first embodiment.

FIG. 2A is a timing chart of the all pixel reading mode in which the signals are read from all of the pixels.

First, the switches SW1 and SW3 come to be in the ON state by setting the connection switching pulses φSW1 and φSW3 to the H level. The switches SW2, SW4, and SW3 come to be in the OFF state by setting the connection switching pulses φSW2, φSW4, and φSW5 to the L level. Therefore, the vertical signal lines 3_1A to 3_4A are electrically connected to the column circuits 4_1 to 4_4. The vertical signal lines 3_1B to 3_4B are electrically disconnected from the column circuits 4_1 to 4_4 (see time t1).

Next, a reading operation becomes possible to be performed on the pixel units 11 to 14 in a first row by the vertical scanning unit 2. When the row selection pulse φROW1 ascends to the H level, the row selection transistors M4 come to be in the ON state. The output signals of the amplifying transistors M3 are output to the vertical signal lines 3_1A to 3_4A, respectively. In addition, when the reset pulse φRST1 ascends to the H level, the reset transistors M2 come to be in the ON state. The gates of the amplifying transistors M3 are reset to a reset potential. The output signals corresponding to the reset potential of the pixel units 11 to 14 are output to the vertical signal lines 3_1A to 3_4A, respectively. At this time, the clamp pulse φCL ascends to the H level, so that the clamp transistors M6 come to be the ON state. Therefore, the potentials of the signals input via the clamp capacitances Cc are clamped on a clamp potential VC. In addition, when the sample-and-hold pulse φSH1 ascends to the H level, the sample-and-hold transistors M7_1 come to be in the ON state, so that the sample-and-hold capacitances Cs_1 come to be in a sampling state (see time t2).

Next, after the reset pulse φRST1 descends to the L level (see time t3), the clamp pulse φCL descends to the L level and the clamping is ended (see time t4). In addition, the transmission pulse φTX1 ascends to the H level, so that the transmission transistors M1 come to be in the ON state. The electric signals according to the light signals generated by the photodiodes PD are transmitted to the gates of the amplifying transistors M3 (see time t5). The transmission pulse φTX1 descends to the L level. Therefore, the amplified signals of the electric signals according to the light signals of the pixel units are output to the vertical signal lines 3_1A to 3_4A. The output signals of the column circuits 4_1 to 4_4 are changed by amounts ΔSig which is caused by the electric signals according to the light signals from the reset potential of the pixel units 11 to 14 due to the clamp capacitances Cc. The noise components included in the reset potential are reduced (see time t6).

When the sample-and-hold pulse φSH1 descends to the L level, the read signals from the column circuits 4_1 to 4_4 are held on the sample-and-hold capacitances Cs_1 of the respective columns (see time t7).

Next, when the horizontal signal line reset pulse φRS1 ascends to the H level, the horizontal signal line 6_1 is reset to the potential of the horizontal signal line reset voltage source VR. Thereafter, when the horizontal signal line reset pulse φRS1 descends to the L level and the column selection pulse φH1_1 ascends to the H level, the output signal of the column circuit 4_1 which is held on the sample-and-hold capacitance Cs_1 is read out to the horizontal signal line 6_1 (see time t10).

The reset operation in which the potential of the horizontal signal line 6_1 becomes the potential of the horizontal signal line reset voltage source VR, and the reading operation of the signals which are held on the sample-and-hold capacitances Cs_1 is repeated. The signals of the first row which are held on the sample-and-hold capacitances Cs_1 are sequentially read out to the horizontal signal line 6_1. The signals are output from the output channel OUT1 via the output amplifier 7_1.

When the horizontal signal line reset pulse φRS1 ascends to the H level and the column selection pulse φH1_1 descends to the L level, the output from the column circuit 4_1 to the horizontal signal line 6_1 which is held on the sample-and-hold capacitance Cs_1 is stopped, and the horizontal signal line 6_1 is reset (see time t12).

Furthermore, when the signal in the first row is read out to the horizontal signal line 6_1, the signals of the pixel units 21 to 24 in the second row are read. At this time, when the connection switching pulses φSW2 and φSW4 ascend to the H level, the switches SW2 and SW4 come to be in the ON state. When the connection switching pulses φSW1, φSW3, and φSW5 descend to the L level, the switches SW1, SW3, and SW5 come to be in the OFF state (see time t11). Therefore, the vertical signal lines 3_1B to 3_4B are electrically connected to the column circuits 4_1 to 4_4. The vertical signal lines 3_1A to 3_4A are electrically disconnected from the column circuits. The signals from the pixel units 21 to 24 of the second row pass through the vertical signal lines 3_1B to 3_4B and the column circuits 4_1 to 4_4. The noise components thereof are reduced and the signals are held on the sample-and-hold capacitance Cs_2 (see time t11 to time t19).

When the reading operation of the pixel signals of the first row which are held on the sample-and-hold capacitances Cs_1 described above is ended, a reading operation is continuously performed in which the pixel signals of the second row held on the capacitances Cs_2 are similarly read out to the horizontal signal line 6_2 (see time t21).

The reset operation in which the potential of the horizontal signal line 6_1 becomes the potential of the horizontal signal line reset voltage source VR, and the reading operation of the signals which are held on the sample-and-hold capacitances Cs_1 are repeated. Therefore, the reading operation of the signals is carried out on the pixel units (see time t21 to time t28).

As described above, the reading operation in which the pixel signals of the Nth row are read out to the horizontal signal line, the reading operation in which the pixel signals of the (N+1)th row are read out to the column circuits, and the noise canceling process in the column circuits are simultaneously carried out. Therefore, the reading operations can be rapidly carried out.

Figure 2B:
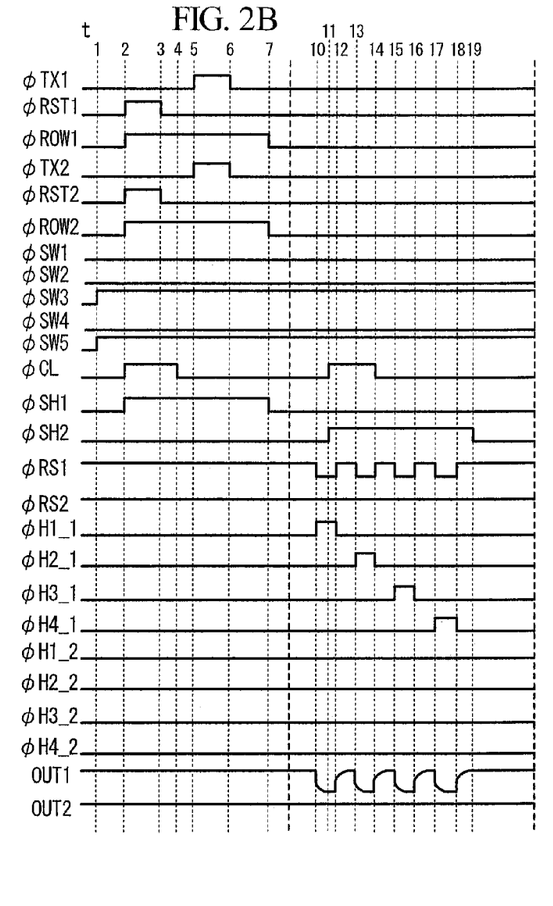

Next, the operations in a case of a ½ column thinning-out mode in which the signals from the respective pixel units are thinned and read out will be described using the timing chart of FIG. 2B.

First, the switches SW3 and SW5 come to be in the ON state by setting the connection switching pulses φSW3 and φSW5 to the H level. The switches SW1, SW2, and SW4 come to be in the OFF state by setting the connection switching pulses φSW1, φSW2, and φSW4 to the L level. Therefore, the vertical signal lines 3_1A and 3_3A are electrically connected to the column circuits 4_1 and 4_3. The vertical signal lines 3_1B and 3_3B are electrically connected to the column circuits 4_2 and 4_4. The vertical signal lines 3_2A, 3_2B, 3_4A, and 3_4B are electrically disconnected from the column circuits (see time t1).

Next, a reading operation becomes possible to be performed on the pixel units 11 to 24 in the first and second rows by the vertical scanning unit 2. When the row selection pulses φROW1 and φROW2 ascend to the H level, the row selection transistors M4 in the first and second rows come to be in the ON state. The output signals of the amplifying transistors M3 in the first and second rows are simultaneously read out to the vertical signal lines 3_1A and 3_1B to 3_4A and 3_4B, respectively. In addition, when the sample-and-hold pulse φSH1 ascends to the H level, the sample-and-hold transistors M7_1 come to be in the ON state, so that the sample-and-hold capacitances Cs_1 come to be in a sampling state. In addition, when the reset pulses φRST1 and φRST2 ascend to the H level, the reset transistors M2 in the first and second rows come to be in the ON state. The gates of the amplifying transistors M3 in the first and second rows are reset to a reset potential. The output signals corresponding to the reset potential of the pixel units 11 to 24 are output to the vertical signal lines 3_1A and 3_1B to 3_4A and 3_4B, respectively. By the connection switching unit, the output signals of the pixel units 11, 13, 21, and 23 are input to the column circuits, and the output signals of the pixel units 12, 14, 22, and 24 are not input to the column circuits. At this time, the clamp pulse φCL ascends to the H level, so that the clamp transistors M6 come to be the ON state. Therefore, the clamp capacitances Cc are clamped on a clamp potential VC (see time t2).

Next, after the reset pulses φRST1 and φRST2 descend to the L level (see time t3), the clamp pulse φCL descends to the L level and the clamping is ended (see time t4). In addition, the transmission pulse φTX1 and φTX2 ascend to the H level, so that the transmission transistors M1 in the first and second rows come to be in the ON state. The electric signals according to the light signals generated by the photodiodes PD in the first and second rows are transmitted to the gates of the amplifying transistors M3 in the first and second rows (see time t5). The transmission pulse φTX1 and φTX2 descend to the L level. Therefore, the amplified signals of the electric signals according to the light signals of the pixel units in the first and second rows are output to the vertical signal lines 3_1A and 3_1B to 3_4A and 3_4B. The output signals of the column circuits 4_1 to 4_4 are changed by amounts ΔSig which is caused by the electric signals according to the light signals from the reset potential of the pixel units 11, 13, 21, and 23 due to the clamp capacitances Cc. The noise components included in the reset potential are reduced (see time t6).

When the sample-and-hold pulse φSH1 descends to the L level, the read signals from the column circuits 4_1 to 4_4 are held on the sample-and-hold capacitances Cs_1 of the respective columns (see time t7).

Next, when the horizontal signal line reset pulse φRS1 ascends to the H level, the horizontal signal line 6_1 is reset to the potential of the horizontal signal line reset voltage source VR. Thereafter, when the horizontal signal line reset pulse φRS1 descends to the L level and the column selection pulse φH1_1 ascends to the H level, the output signal of the column circuit 4_1 according to the pixel unit 11 which is held on the sample-and-hold capacitance Cs_1 is read out to the horizontal signal line 6_1 (see time t10).

Next, when the horizontal signal line reset pulse φRS1 ascends to the H level and the column selection pulse φH1_1 descends to the L level, the output from the column circuit 4_1 to the horizontal signal line 6_1 which is held on the sample-and-hold capacitance Cs_1 is stopped, and the horizontal signal line 6_1 is reset (see time t12).

Next, by setting the column selection pulse φH2_1 to the H level, the output signal of the column circuit 4_2 according to the pixel unit 21 which is held on the sample-and-hold capacitance Cs_1 is read out to the horizontal signal line 6_1. Repeating the above operations, the signals of the first and second rows are sequentially read out to the horizontal signal line 6_1 in every other column, and output from the output channel OUT1 via the output amplifier 7_1.

Furthermore, when the signals of the first and second rows are read out to the horizontal signal line 6_1, the reading of the signals of the pixel units of the third and fourth rows is carried out as in the first and second rows. At this time, similar to the reading of the first and second rows, when the connection switching pulses φSW3 and φSW5 ascend to the H level, the switches SW3 and SW5 come to be in the ON state. When the connection switching pulses φSW1, φSW2, and φSW4 descend to the L level, the switches SW1, SW2, and SW4 come to be the OFF state. Therefore, the vertical signal lines 3_1A and 3_3A are electrically connected to the column circuits 4_1 and 4_3. The vertical signal lines 3_1B and 3_3B are electrically connected to the column circuits 4_2 and 4_4. The vertical signal lines 3_2A, 3_2B, 3_4A, and 3_4B are electrically disconnected from the column circuits. The signals from the pixel units 31, 33, 41, and 43 of the third and fourth rows pass through the vertical signal lines 3_1A, 3_1B, 3_3A, and 3_3B and the column circuits 4_1 to 4_4. Similarly to the first and second rows, the noise components thereof are reduced and the signals are held on the sample-and-hold capacitance Cs_2.

When the reading operations of the thinned-out pixel signals of the first and second rows which are held on the sample-and-hold capacitances Cs_1 are ended, the reading operation is similarly continuously performed in which the thinned-out pixel signals of the third and fourth rows held on the capacitances Cs_2 are similarly read out to the horizontal signal line 6_2.

The above-mentioned operations are repeated and the reading of the signals is carried out in which all of the pixels are thinned out by ½ column.

As described above, at the time of the ½ column thinning-out reading, the column circuits disposed on the pixel columns which are not read out are used to carry out the reading of two columns at the same time, so that the reading can be carried out at high speed.

Figure 3A:
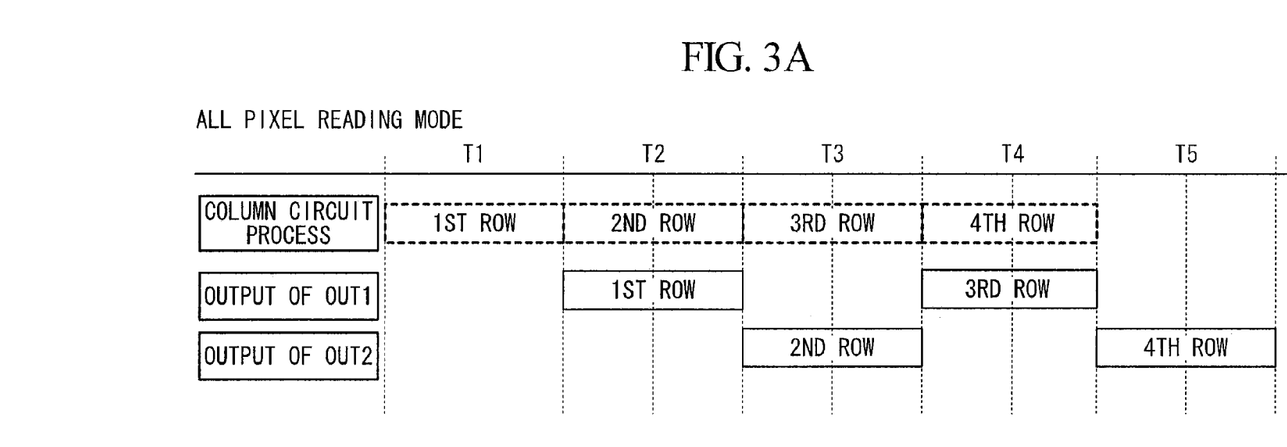
FIGS. 3A and 3B are schematic timing charts according to the first embodiment.
Figure 3B:
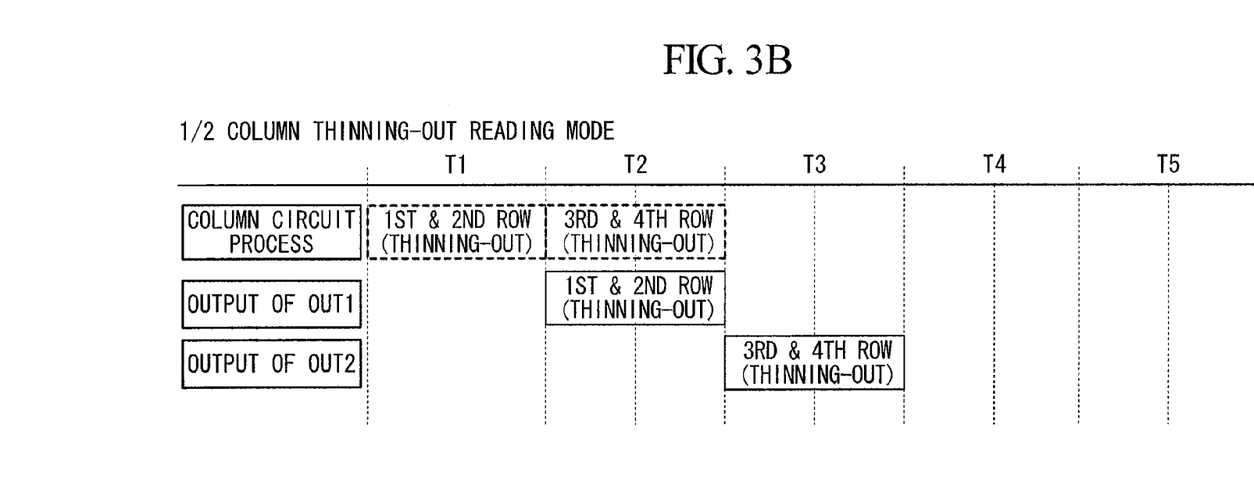

FIGS. 3A and 3B are conceptual diagrams showing the relationship between a reading period of the pixel signals in the all pixel reading mode, the ½ column thinning-out reading mode and a reading period of the signals from the column circuits.

FIG. 3A shows a case of the all pixel reading mode. As shown in the drawing, it takes time corresponding to cycles T1 to T5 in order to read the signals of the pixel units from the first row to the fourth row. Processing the signals of the pixel units from the first row to the fourth row carried by the column circuits corresponds to cycles T1 to T4. In addition, after delaying the cycle by one cycle, processing the output signals of the pixel units from the first row to the fourth row carried by the column circuits corresponds to the cycles T2 to T5.

FIG. 3B shows a case of the ½ column thinning-out reading mode. As shown in the drawing, the reading of the signals which are thinned out by ½ column among the pixel units from the first row to the fourth row can be processed in a period of cycles T1 to T3. Processing the signals of the pixel units from the first row to the fourth row carried by the column circuits corresponds to the cycles T1 to T2. In addition, after delaying the cycle by one cycle, processing the thinned-out output signals of the pixel units from the first row to the fourth row carried by the column circuits corresponds to the cycles T2 to T3. In this embodiment, the output signals of the first and second rows and the output signals of the third and fourth rows are output together every second row in order of the scanned rows.

According to this embodiment, at the time of the ½ column thinning-out reading, it is possible to perform the reading at high speed compared with the related art. In addition, in this embodiment, the information of the pixel units of the first row and the information of the pixel units of the second row are alternately output. In addition, since the operations of the horizontal scanning units 5_1 and 5_2 are not changed in the all pixel reading mode and the ½ column thinning-out reading mode, the control is easily carried out.

Second Embodiment

Figure 4:
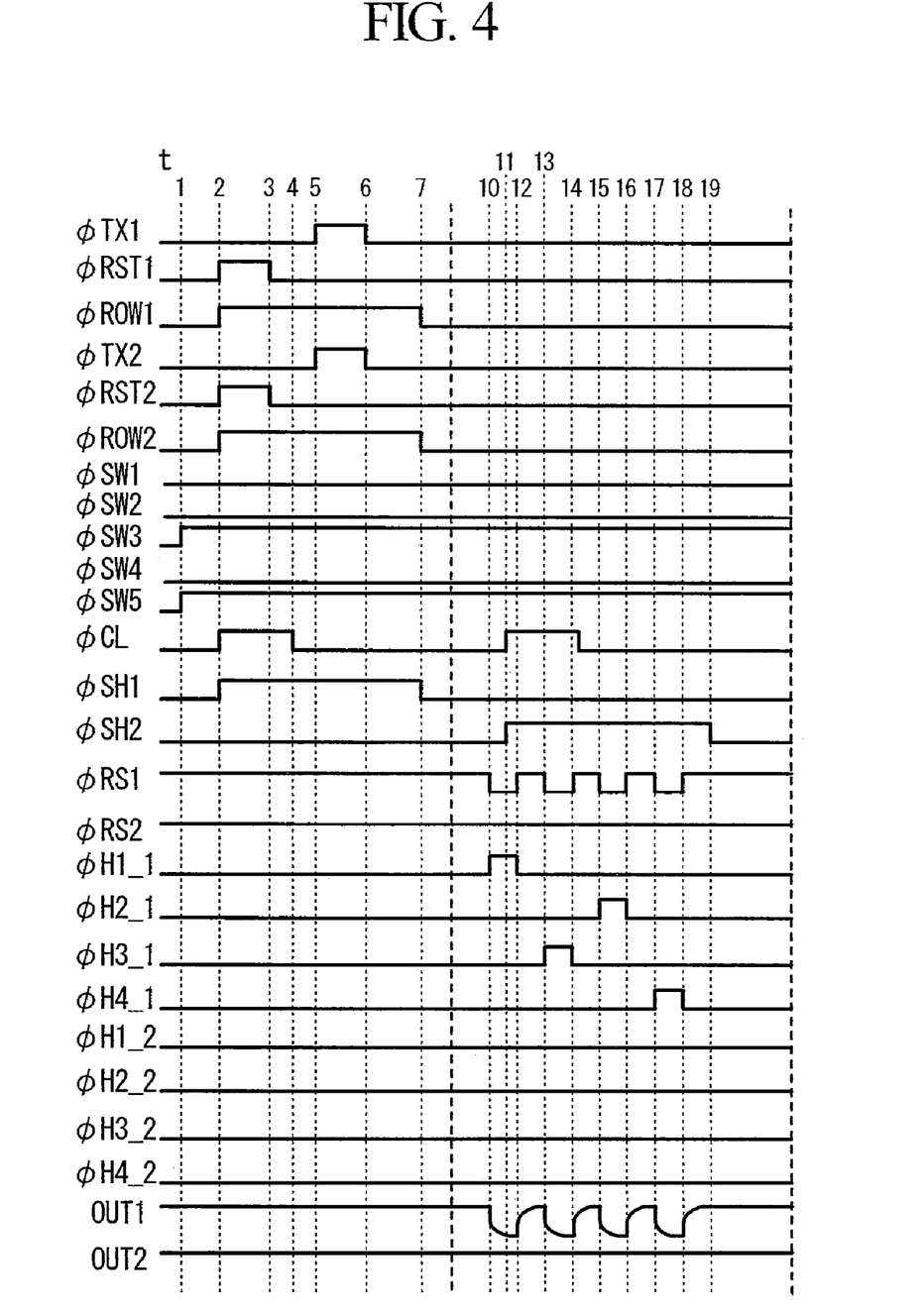
FIG. 4 is a timing chart according to a second embodiment.

FIG. 4 shows a timing chart illustrating a second embodiment of the invention. The configuration diagram is the same as that of the first embodiment shown in FIG. 1. In addition, the timing of the all pixel reading mode in which the signals from all of the pixels are read is the same as that of the first embodiment shown in FIG. 2A. Therefore, the timing of the ½ column thinning-out reading mode according to the second embodiment will be described with reference to FIG. 4B.

First, when the connection switching pulses φSW3 and φSW5 ascend to the H level, the switches SW3 and SW5 come to be in the ON state. When the connection switching pulses φSW1, φSW2, and φSW4 descend to the L level, the switches SW1, SW2, and SW4 come to be in the OFF state. Therefore, the vertical signal lines 3_1A and 3_3A are electrically connected to the column circuits 4_1 and 4_3, the vertical signal lines 3_1B and 3_3B are electrically connected to the column circuits 4_2 and 4_4, and the vertical signal lines 3_2A, 3_2B, 3_4A, and 3_4B are electrically disconnected from the column circuits (see time t1).

Next, a reading operation becomes possible to be performed on the pixel units 11 to 24 in the first and second rows by the vertical scanning unit 2. When the row selection pulses φROW1 and φROW2 ascend to the H level, the row selection transistors M4 in the first and second rows come to be in the ON state. The output signals of the amplifying transistors M3 in the first and second rows are simultaneously read out to the vertical signal lines 3_1A and 3_1B to 3_4A and 3_4B, respectively. In addition, when the sample-and-hold pulse φSH1 ascends to the H level, the sample-and-hold transistors M7_1 come to be in the ON state, so that the sample-and-hold capacitances Cs_1 come to be in a sampling state. In addition, when the reset pulses φRST1 and φRST2 ascend to the H level, the reset transistors M2 in the first and second rows come to be in the ON state. The gates of the amplifying transistors M3 in the first and second rows are reset to a reset potential. The output signals corresponding to the reset potential of the pixel units 11 to 24 are read out to the vertical signal lines 3_1A and 3_1B to 3_4A and 3_4B, respectively. By the connection switching unit, the output signals of the pixel units 11, 13, 21, and 23 are input to the column circuits, and the output signals of the pixel units 12, 14, 22, and 24 are not input to the column circuits. At this time, the clamp pulse φCL ascends to the H level, so that the clamp transistors M6 come to be the ON state. Therefore, the clamp capacitances Cc are clamped on a clamp potential VC (see time t2).

Next, after the reset pulses φRST1 and φRST2 descend to the L level (see time t3), the clamp pulse φCL descends to the L level and the clamping is ended (see time t4). In addition, the transmission pulse φTX1 and φTX2 ascend to the H level, so that the transmission transistors M1 in the first and second rows come to be in the ON state. The electric signals according to the light signals generated by the photodiodes PD in the first and second rows are transmitted to the gates of the amplifying transistors M3 in the first and second rows (see time t5). The transmission pulse φTX1 and φTX2 descend to the L level. Therefore, the amplified signals of the electric signals according to the light signals of the pixel units in the first and second rows are output to the vertical signal lines 3_1A and 3_1B to 3_4A and 3_4B. The output signals of the column circuits 4_1 to 4_4 are changed by amounts ΔSig which is caused by the electric signals according to the light signals from the reset potential of the pixel units 11, 13, 21, and 23 due to the clamp capacitances Cc. The noise components included in the reset potential are reduced (see time t6).

When the sample-and-hold pulse φSH1 descends to the L level, the read signals from the column circuits 4_1 to 4_4 are held on the sample-and-hold capacitances Cs_1 of the respective columns (see time t7).

Next, when the horizontal signal line reset pulse φRS1 ascends to the H level, the horizontal signal line 6_1 is reset to the potential of the horizontal signal line reset voltage source VR. Thereafter, when the horizontal signal line reset pulse φRS1 descends to the L level and the column selection pulse φH1_1 ascends to the H level, the output signal of the column circuit 4_1 according to the pixel unit 11 which is held on the sample-and-hold capacitance Cs_1 is read out to the horizontal signal line 6_1 (see time t10).

Next, when the horizontal signal line reset pulse φRS1 ascends to the H level and the column selection pulse φH1_1 descends to the L level, the output from the column circuit 4_1 to the horizontal signal line 6_1 which is held on the sample-and-hold capacitance Cs_1 is stopped, and the horizontal signal line 6_1 is reset (see time t12).

By repeating the above operations, the thinned-out signals of the first row are read. When all the signals of the first row are read out, the output signal which is held on the sample-and-hold capacitance Cs_1 by the column selection pulse φH2_1 and output from the column circuit 4_2 corresponding to the pixel unit 21 is subsequently read out to the horizontal signal line 6_1. Next, the output signal which is held on the sample-and-hold capacitance Cs_1 by the column selection pulse φH4_1 and output from the column circuit 4_4 corresponding to the pixel circuit 23 is read out to the horizontal signal line 6_1. Repeating the above operations, the thinned-out signals of the second row are read out.

By the above operations, the signals of the first and second rows are sequentially read out to the horizontal signal line 6_1 in every other column, and output from the output channel OUT1 via the output amplifier 7_1.

Furthermore, when the signals of the first and second rows are read out to the horizontal signal line 6_1, the reading of the signals of the pixel units of the third and fourth rows are carried out as in the first and second rows. At this time, similar to the reading of the first and second rows, the switches SW3 and SW5 come to be in the ON state using the connection switching pulses φSW3 and φSW5. The switches SW1, SW2, and SW4 come to be the OFF state using the connection switching pulses φSW1, φSW2, and φSW4. Therefore, the vertical signal lines 3_1A and 3_3A are electrically connected to the column circuits 4_1 and 4_3. The vertical signal lines 3_1B and 3_3B are electrically connected to the column circuits 4_2 and 4_4. The vertical signal lines 3_2A, 3_2B, 3_4A, and 3_4B are electrically disconnected from the column circuits. The signals from the pixel units 31, 33, 41, and 43 of the third and fourth rows pass through the vertical signal lines 3_1A, 3_1B, 3_3A, and 3_3B and the column circuits 4_1 to 4_4. Similarly to the first and second rows, the noise components thereof are reduced and the signals are held on the sample-and-hold capacitance Cs_2.

When the reading operations of the pixel signals of the first and second rows which are held on the sample-and-hold capacitances Cs_1 are ended, a reading operation is continuously performed in which the pixel signals of the third and fourth rows held on the capacitances Cs_2 are similarly read out to the horizontal signal line 6_2.

The above-mentioned operations are repeated and a reading of the signals is carried out in which all of the pixels are thinned out by ½ column.

As described above, at the time of the ½ column thinning-out reading, the column circuits disposed on the pixel columns which are not read out are used to carry out the reading of two columns at the same time, so that the reading can be carried out at high speed.

Figure 5A:
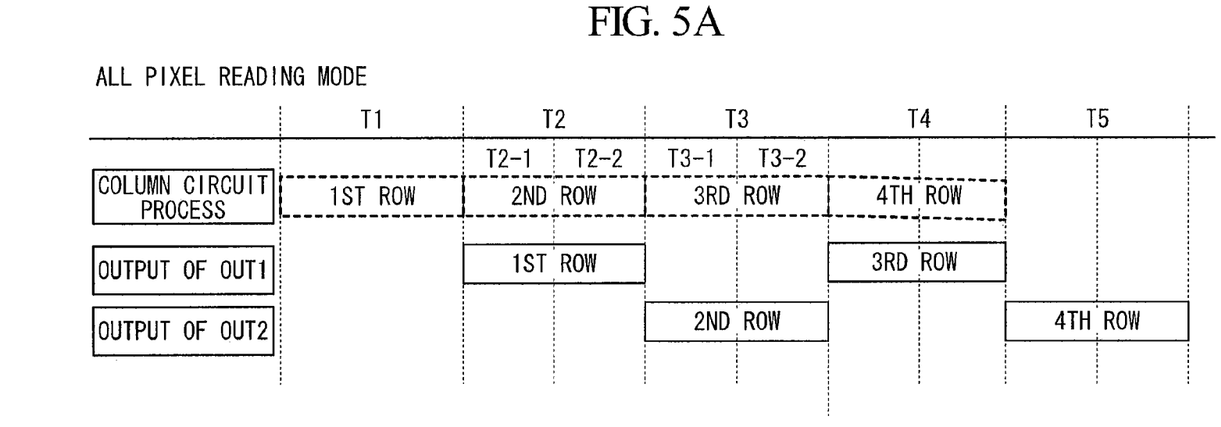
FIGS. 5A and 5B are schematic timing charts according to the second embodiment.
Figure 5B:
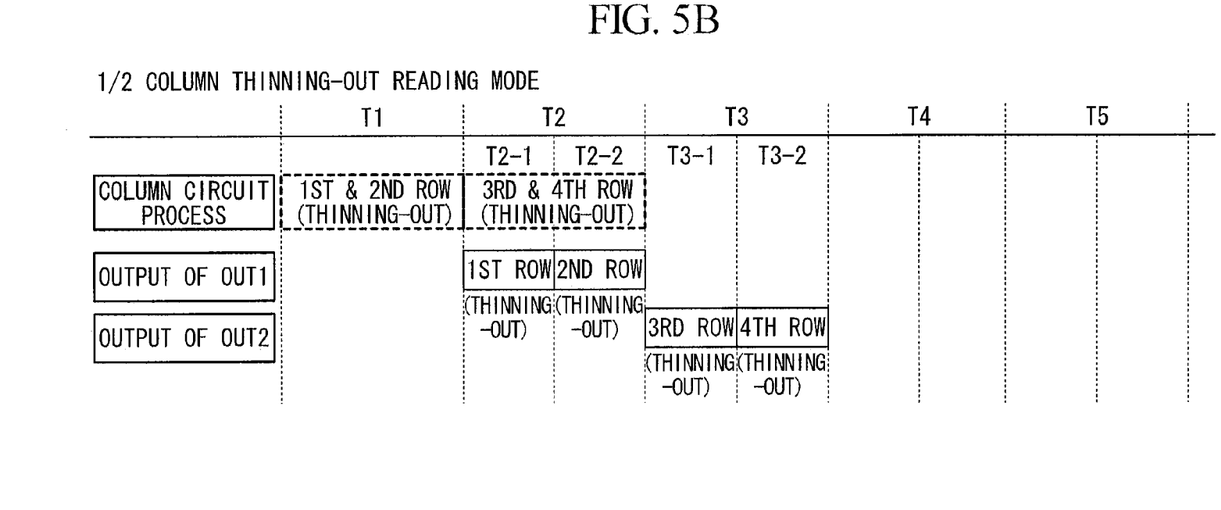

FIGS. 5A and 5B are conceptual diagrams showing the relationship between a reading period of the pixel signals in the all pixel reading mode, the ½ column thinning-out reading mode and a reading period of the signals from the column circuits.

FIG. 5A shows a case of the all pixel reading mode. As shown in the drawing, it takes time corresponding to cycles T1 to T5 in order to read the signals of the pixel units from the first row to the fourth row. FIG. 5A is the same as the above-mentioned FIG. 3A.

FIG. 5B shows a case of the ½ column thinning-out reading mode. As shown in the drawing, the reading of the signals which are thinned out by ½ column among the pixel units from the first row to the fourth row can be processed in a period of cycles T1 to T3. Thinning-out the signals of the pixel units from the first row to the fourth row so as to be processed by the column circuits corresponds to the cycles T1 to T2. In addition, after delaying the cycle by one cycle, processing the thinned-out output signals of the pixel units from the first row to the fourth row carried by the column circuits corresponds to the cycles T2 to T3. In this embodiment, the output data are output together every row in order of the scanned rows.

According to this embodiment, at the time of the ½ column thinning-out reading, it is possible to perform the reading at high speed compared with the related art.

In addition, since the signals of two rows are separated and captured at different timings, the subsequent processes are easily implemented.

Third Embodiment

Figure 6:
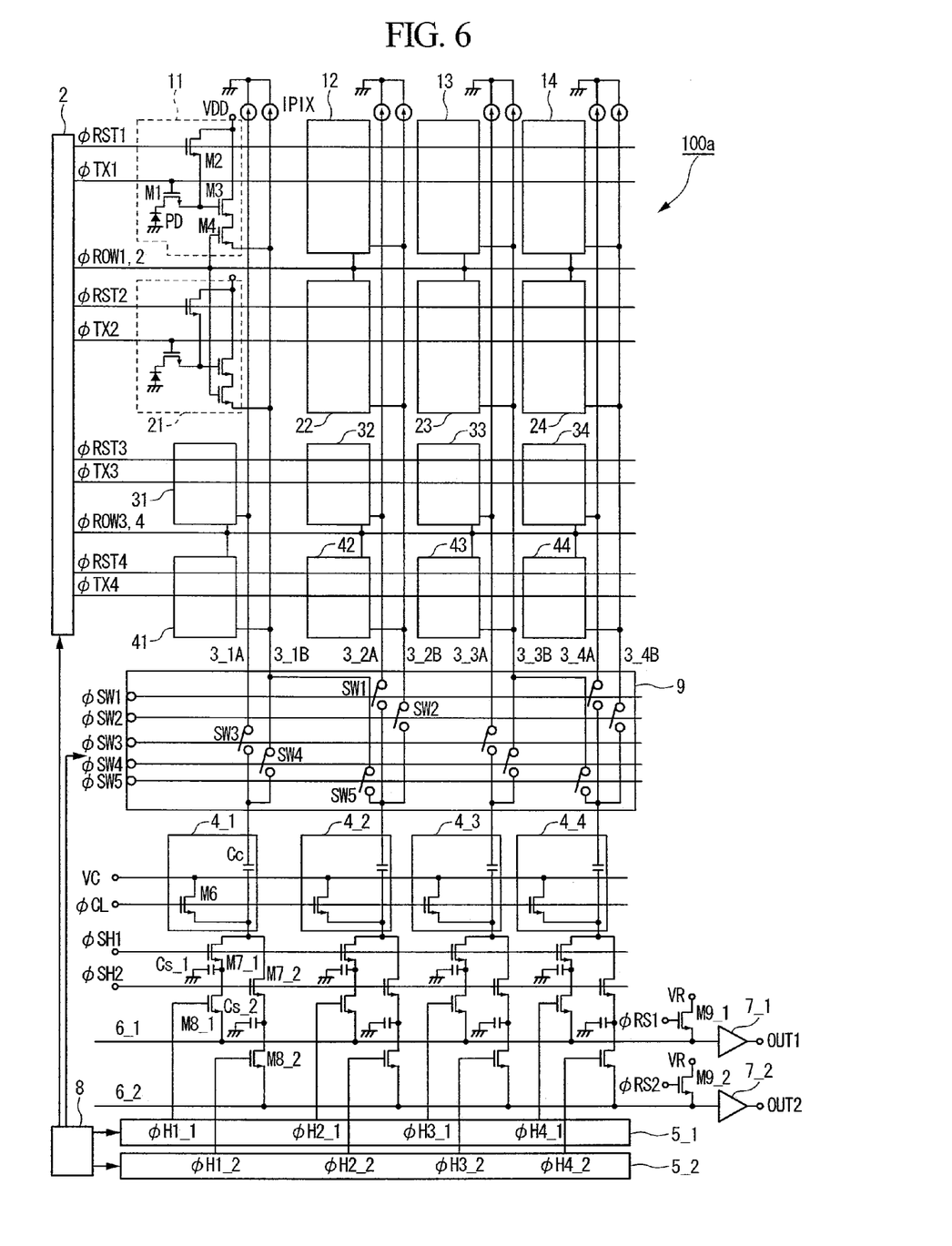
FIG. 6 is a block diagram illustrating a configuration of a solid-state imaging device according to the second embodiment.

FIG. 6 is a block diagram schematically illustrating a configuration of the solid-state imaging device according to a third embodiment of the invention.

A solid-state imaging device 100a shown in the drawing is provided with pixel units 11 to 44, a vertical scanning unit 2a, vertical signal lines 3_1A and 3_1B to 3_4A and 3_4B, a pixel bias current source IPIX, column circuits 4_1 to 4_4, a connection switching unit 9, sample-and-hold transistors M7_1 and M7_2, sample-and-hold capacitances Cs_1 and Cs_2, column selection transistors M8_1 and M8_2, horizontal scanning units 5_1 and 5_2, horizontal signal line reset transistors M9_1 and M9_2, output amplifiers 7_1 and 7_2, and a mode setting unit 8.

The vertical scanning unit 2a of solid-state imaging device 100a connects a common control line, which outputs the row selection pulses φROW1 and φROW2 selecting the pixel units of the first and second rows, to the pixel units of the first and second rows.

The vertical scanning unit 2a connects a common control line, which outputs the row selection pulses φROW3 and φROW4 selecting the pixel units of the third and fourth rows, to the pixel units of the third and fourth rows.

The configuration shown in FIG. 6 is different from the configuration shown in FIG. 1 in that the gates of the selection transistors M4 of the first and second rows are connected to the common row selection pulses φROW1 and φROW2, and the gates of the row selection transistors M4 of the third and fourth rows are connected to the common row selection pulses φROW3 and φROW4. The other configurations are the same as those of the first embodiment.

Figure 7A:
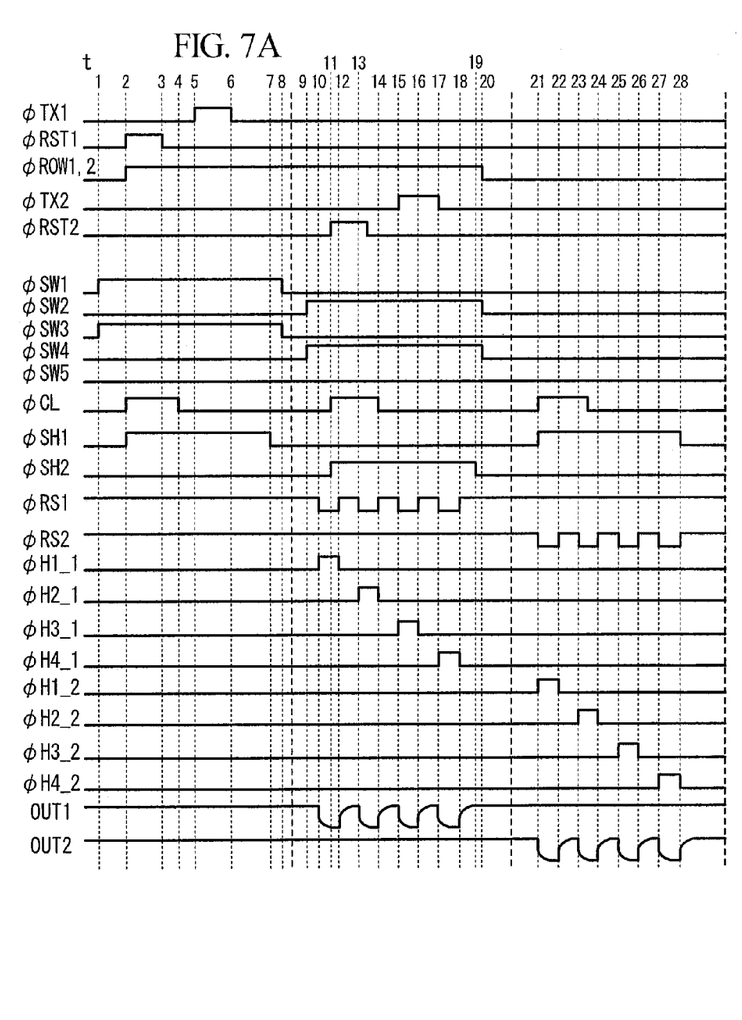
FIGS. 7A and 7B are timing charts according to a third embodiment.

FIG. 7A is a timing chart of the all pixel reading mode in which the signals are read from all of the pixels.

First, the switches SW1 and SW3 come to be in the ON state by setting the connection switching pulses φSW1 and φSW3 to the H level. The switches SW2, SW4, and SW3 come to be in the OFF state by setting the connection switching pulses φSW2, φSW4, and φSW5 to the L level. Therefore, the vertical signal lines 3_1A to 3_4A are electrically connected to the column circuits 4_1 to 4_4. The vertical signal lines 3_1B to 3_4B are electrically disconnected from the column circuits 4_1 to 4_4 (see time t1).

Next, a reading operation becomes possible to be performed on the pixel units 11 to 24 in the first and second rows by the vertical scanning unit 2. When the row selection pulses φROW1 and φROW2 ascend to the H level, the row selection transistors M4 of the first and second rows come to be in the ON state. The output signals of the amplifying transistors M3 are output to the vertical signal lines 3_1A and 3_1B to 3_4A and 3_4B, respectively. In addition, when the reset pulse φRST1 ascends to the H level, the reset transistors M2 come to be in the ON state. The gates of the amplifying transistors M3 are reset to a reset potential. The output signals corresponding to the reset potential of the pixel units 11 to 14 are output to the vertical signal lines 3_1A to 3_4A, respectively. At this time, the clamp pulse φCL ascends to the H level, so that the clamp transistors M6 come to be the ON state. Therefore, the clamp capacitances Cc are clamped on a clamp potential VC. In addition, when the sample-and-hold pulse φSH1 ascends to the H level, the sample-and-hold transistors M7_1 come to be in the ON state, so that the sample-and-hold capacitances Cs_1 come to be in a sampling state (see time t2).

Next, after the reset pulse φRST1 descends to the L level (see time t3), the clamp pulse φCL descends to the L level and the clamping is ended (see time t4). In addition, the transmission pulse φTX1 ascends to the H level, so that the transmission transistors M1 come to be in the ON state. The electric signals according to the light signals generated by the photodiodes PD are transmitted to the gates of the amplifying transistors M3 (see time t5). The transmission pulse φTX1 descends to the L level. Therefore, the amplified signals of the electric signals according to the light signals of the pixel units are output to the vertical signal lines 3_1A to 3_4A. The output signals of the column circuits 4_1 to 4_4 are changed by amounts ΔSig which is caused by the electric signals according to the light signals from the reset potential of the pixel units 11 to 14 due to the clamp capacitances Cc. The noise components included in the reset potential are reduced (see time t6).

When the sample-and-hold pulse φSH1 descends to the L level, the read signals from the column circuits 4_1 to 4_4 are held on the sample-and-hold capacitances Cs_1 of the respective columns (see time t7).

Next, when the horizontal signal line reset pulse φRS1 ascends to the H level, the horizontal signal line 6_1 is reset to the potential of the horizontal signal line reset voltage source VR. Thereafter, when the horizontal signal line reset pulse φRS1 descends to the L level and the column selection pulse φH1_1 ascends to the H level, the output signal of the column circuit 4_1 which is held on the sample-and-hold capacitance Cs_1 is read out to the horizontal signal line 6_1 (see time t10).

The reset operation in which the potential of the horizontal signal line 6_1 becomes the potential of the horizontal signal line reset voltage source VR, and the reading operation of the signals which are held on the sample-and-hold capacitances Cs_1 are repeated. The signals of the first row which are held on the sample-and-hold capacitances Cs_1 are sequentially read out to the horizontal signal line 6_1. The signals are output from the output channel OUT1 via the output amplifier 7_1.

When the horizontal signal line reset pulse φRS1 ascends to the H level and the column selection pulse φH1_1 descends to the L level, the output from the column circuit 4_1 to the horizontal signal line 6_1 which is held on the sample-and-hold capacitance Cs_1 is stopped, and the horizontal signal line 6_1 is reset (see time t12).

Furthermore, when the signal in the first row is read out to the horizontal signal line 6_1, the signals of the pixel units 21 to 24 in the second row are read. At this time, when the connection switching pulses φSW2 and φSW4 ascend to the H level, the switches SW2 and SW4 come to be in the ON state. When the connection switching pulses φSW1, φSW3, and φSW5 descend to the L level, the switches SW1, SW3, and SW5 come to be in the OFF state (see time t11). Therefore, the vertical signal lines 3_1B to 3_4B are electrically connected to the column circuits 4_1 to 4_4. The vertical signal lines 3_1A to 3_4A are electrically disconnected from the column circuits. The signals from the pixel units 21 to 24 of the second row pass through the vertical signal lines 3_1B to 3_4B and the column circuits 4_1 to 4_4. Similarly to the first row, the noise components thereof are reduced and the signals are held on the sample-and-hold capacitance Cs_2 (see time t11 to time t19).

When the reading operation of the pixel signals of the first row which are held on the sample-and-hold capacitances Cs_1 described above is ended, the reading operation is continuously performed in which the pixel signals of the second row held on the capacitances Cs_2 are similarly read out to the horizontal signal line 6_2 (see time t21).

The reset operation in which the potential of the horizontal signal line 6_1 becomes the potential of the horizontal signal line reset voltage source VR, and the reading operation of the signals which are held on the sample-and-hold capacitances Cs_1 are repeated. Therefore, the reading operation of the signals is carried out on all of the pixel units (see time t21 to time t28).

As described above, the reading operation in which the pixel signals of the Nth row are read out to the horizontal signal line, the reading operation in which the pixel signals of the (N+1)th row are read out to the column circuits, and the noise canceling process in the column circuits are simultaneously carried out. Therefore, the reading operations can be rapidly carried out.

Figure 7B:
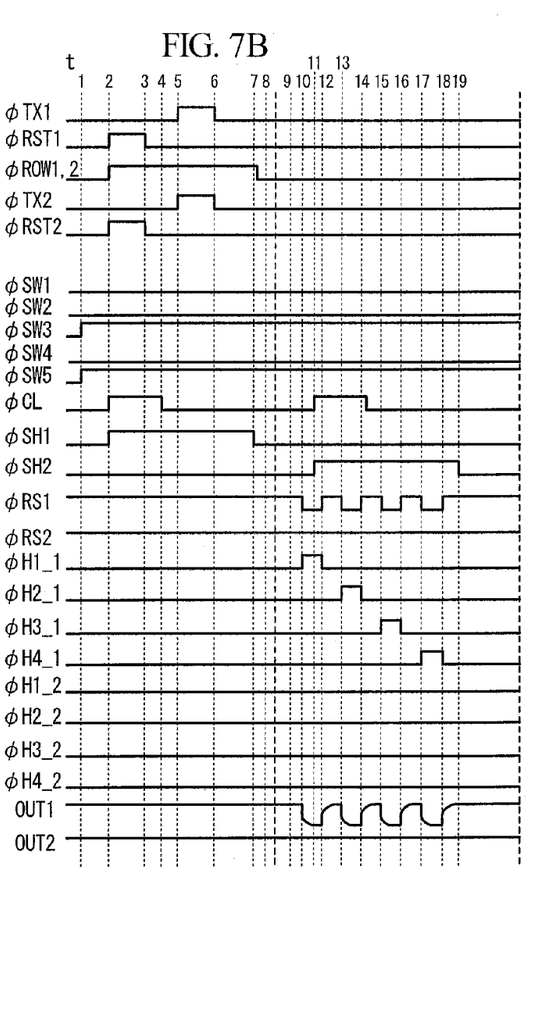

Next, the operations in a case of a ½ column thinning-out mode in which the signals from the respective pixel units are thinned and read out will be described using the timing chart of FIG. 7B.

First, the switches SW3 and SW5 come to be in the ON state by setting the connection switching pulses φSW3 and φSW5 to the H level. The switches SW1, SW2, and SW4 come to be in the OFF state by setting the connection switching pulses φSW1, φSW2, and φSW4 to the L level. Therefore, the vertical signal lines 3_1A and 3_3A are electrically connected to the column circuits 4_1 and 4_3. The vertical signal lines 3_1B and 3_3B are electrically connected to the column circuits 4_2 and 4_4. The vertical signal lines 3_2A, 3_2B, 3_4A, and 3_4B are electrically disconnected from the column circuits (see time t1).

Next, a reading operation becomes possible to be performed on the pixel units 11 to 24 in the first and second rows by the vertical scanning unit 2. When the row selection pulses φROW1 and φROW2 ascend to the H level, the row selection transistors M4 in the first and second rows come to be in the ON state. The output signals of the amplifying transistors M3 in the first and second rows are simultaneously read out to the vertical signal lines 3_1A and 3_1B to 3_4A and 3_4B, respectively. In addition, when the sample-and-hold pulse φSH1 ascends to the H level, the sample-and-hold transistors M7_1 come to be in the ON state, so that the sample-and-hold capacitances Cs_1 come to be in a sampling state. In addition, when the reset pulses φRST1 and φRST2 ascend to the H level, the reset transistors M2 in the first and second rows come to be in the ON state. The gates of the amplifying transistors M3 in the first and second rows are reset to a reset potential. The output signals corresponding to the reset potential of the pixel units 11 to 24 are output to the vertical signal lines 3_1A and 3_1B to 3_4A and 3_4B, respectively. By the connection switching unit, the output signals of the pixel units 11, 13, 21, and 23 are input to the column circuits, and the output signals of the pixel units 12, 14, 22, and 24 are not input to the column circuits. At this time, the clamp pulse φCL ascends to the H level, so that the clamp transistors M6 come to be the ON state. Therefore, the clamp capacitances Cc are clamped on a clamp potential VC (see time t2).

Next, after the reset pulses φRST1 and φRST2 descend to the L level (see time t3), the clamp pulse φCL descends to the L level and the clamping is ended (see time t4). In addition, the transmission pulse φTX1 and φTX2 ascend to the H level, so that the transmission transistors M1 in the first and second rows come to be in the ON state. The electric signals according to the light signals generated by the photodiodes PD in the first and second rows are transmitted to the gates of the amplifying transistors M3 in the first and second rows (see time t5). The transmission pulse φTX1 and φTX2 descend to the L level. Therefore, the amplified signals of the electric signals according to the light signals of the pixel units in the first and second rows are output to the vertical signal lines 3_1A and 3_1B to 3_4A and 3_4B. The output signals of the column circuits 4_1 to 4_4 are changed by amounts ΔSig which is caused by the electric signals according to the light signals from the reset potential of the pixel units 11, 13, 21, and 23 due to the clamp capacitances Cc. The noise components included in the reset potential are reduced (see time t6).

When the sample-and-hold pulse φSH1 descends to the L level, the read signals from the column circuits 4_1 to 4_4 are held on the sample-and-hold capacitances Cs_1 of the respective columns (see time t7).

Next, when the horizontal signal line reset pulse φRS1 ascends to the H level, the horizontal signal line 6_1 is reset to the potential of the horizontal signal line reset voltage source VR. Thereafter, when the horizontal signal line reset pulse φRS1 descends to the L level and the column selection pulse φH1_1 ascends to the H level, the output signal of the column circuit 4_1 according to the pixel unit 11 which is held on the sample-and-hold capacitance Cs_1 is read out to the horizontal signal line 6_1 (see time t10).

Next, when the horizontal signal line reset pulse φRS1 ascends to the H level and the column selection pulse φH1_1 descends to the L level, the output from the column circuit 4_1 to the horizontal signal line 6_1 which is held on the sample-and-hold capacitance Cs_1 is stopped, and the horizontal signal line 6_1 is reset (see time t12).

Next, by setting the column selection pulse φH2_1 to the H level, the output signal of the column circuit 4_2 according to the pixel unit 21 which is held on the sample-and-hold capacitance Cs_1 is read out to the horizontal signal line 6_1. Repeating the above operations, the signals of the first and second rows are sequentially read out to the horizontal signal line 6_1 in every other column, and output from the output channel OUT1 via the output amplifier 7_1.

Furthermore, when the signals of the first and second rows are read out to the horizontal signal line 6_1, the reading of the signals of the pixel units of the third and fourth rows is carried out as in the first and second rows. At this time, similar to the reading of the first and second rows, the switches SW3 and SW5 come to be in the ON state using the connection switching pulses φSW3 and φSW5. The switches SW1, SW2, and SW4 come to be the OFF state using the connection switching pulses φSW1, φSW2, and φSW4. Therefore, the vertical signal lines 3_1A and 3_3A are electrically connected to the column circuits 4_1 and 4_3. The vertical signal lines 3_1B and 3_3B are electrically connected to the column circuits 4_2 and 4_4. The vertical signal lines 3_2A, 3_2B, 3_4A, and 3_4B are electrically disconnected from the column circuits. The signals from the pixel units 31, 33, 41, and 43 of the third and fourth rows pass through the vertical signal lines 3_1A, 3_1B, 3_3A, and 3_3B and the column circuits 4_1 to 4_4. Similarly to the first and second rows, the noise components thereof are reduced and the signals are held on the sample-and-hold capacitance Cs_2.

When the reading operations of the thinned-out pixel signals of the first and second rows which are held on the sample-and-hold capacitances Cs_1 are ended, the reading operation is continuously performed in which the thinned-out pixel signals of the third and fourth rows held on the capacitances Cs_2 are similarly read out to the horizontal signal line 6_2.

The above-mentioned operations are repeated and the reading of the signals is carried out in which all of the pixels are thinned out by ½ column.

As described above, at the time of the ½ column thinning-out reading, the column circuits disposed on the pixel columns which are not read out are used to carry out the reading of two rows at the same time, so that the reading can be carried out at high speed.

According to this embodiment, at the time of the ½ column thinning-out reading, it is possible to perform the reading at high speed compared with the related art. In addition, since the row selection pulse is commonly used by the pixel units of two rows, the number of wirings can be reduced.

Further, in the solid-state imaging devices 100 and 100a, each of the pixel units 11 to 44 includes the amplifying transistor M3 which amplifies the output signal of the photodiode PD and outputs the pixel signal, and all the pixel units are two-dimensionally disposed in a matrix direction. The plural vertical signal lines 3_1A and 3_1B to 3_4A to 3_4B are provided for each column, and the pixel signals from the amplifying transistors M3 are output to each of plural rows. The plural column circuits 4_1 to 4_4 are provided for each column, and process the signals of the vertical signal lines 3_1A and 3_1B to 3_4A and 3_4B. The connection switching unit 9 switches connection between the plural vertical signal lines 3_1A and 3_1B to 3_4A and 3_4B and the column circuits 4_1 to 4_4 based on the input signals. The mode control unit 8 inputs signals to the connection switching unit 9, and controls switching between the all pixel reading mode (first mode) in which the plural vertical signal lines 3_1A and 3_1B to 3_4A and 3_4B are connected to the column circuits 4_1 to 4_4 on the same column thereof and the ½ thinning-out reading mode (second mode) in which the plural vertical signal lines 3_1A and 3_1B to 3_4A and 3_4B are connected to the column circuits 4_1 to 4_4 on another column.

In addition, the all pixel reading mode (first mode) is a mode in which the signals from all of the pixels are input to the column circuits. The ½ thinning-out reading mode (second mode) is a mode in which the signals from the pixel units are thinned out in the unit of plural columns and input to the column circuits.

In addition, at the ½ thinning-out reading mode, one of the plural column signal lines, which are connected to a column of a read pixel, to the column circuit disposed on a column of a non-read pixel.

Therefore, a high speed reading can be carried out at the time of the column thinning-out reading mode.

In addition, the horizontal scanning unit sequentially reads the signals from the column circuits. The horizontal scanning unit performs the same operation in both the all pixel reading mode and the ½ column thinning-out reading mode.

Therefore, a high speed reading can be carried out at the time of the column thinning-out reading mode with simple control.

In addition, the horizontal scanning unit sequentially reads the signals from the column circuits. The horizontal scanning unit performs an operation in the all pixel reading mode which is different from that in the ½ column thinning-out reading mode.

Therefore, a high speed reading can be carried out at the column thinning-out reading mode. Furthermore, the signals can be output such that the subsequent processes are easily implemented.

In addition, the pixel unit includes the selection switch which switches connection with the plural vertical signal lines. A control line which controls the selection switch is connected to the pixel units of the plural rows.

Therefore, a high speed reading can be carried out at the time of the column thinning-out reading mode. Furthermore, the number of wirings of the pixel unit can be reduced.

Further, the invention is not limited to the above-mentioned embodiments, but various changes can be made without departing from the scope of the main points of the invention. For example, the column circuit according to the invention may include an amplifying circuit or an analog-digital converter. By applying the invention to such a configuration, the circuits disposed on a non-read column are used at the time of the column thinning-out reading mode, so that a high speed reading can be carried out.

Further, the solid-state imaging device according to the invention corresponds to the solid-state imaging devices 100 and 100a. In addition, the pixel unit according to the invention corresponds to the pixel units 11 to 44. In addition, the column signal line according to the invention corresponds to the vertical signal lines 3_1A and 3_1B to 3_4A and 3_4B. In addition, the column circuit according to the invention corresponds to the column circuits 4_1 to 4_4. In addition, the switching means according to the invention corresponds to the connection switching unit 9. In addition, the mode control unit according to the invention corresponds to the mode setting unit 8. In addition, the horizontal scanning unit according to the invention corresponds to the horizontal scanning units 5_1 and 5_2.

While the exemplary embodiments of the invention have been described with reference to the accompanying drawings, the detailed constitutions of the invention are not limited to the foregoing embodiments but embrace changes in design to the extent that they do not depart from the concept of the invention.

What is claimed is:
1. A solid-state imaging device comprising:
   a plurality of pixel units which are two-dimensionally disposed in a matrix direction, and each of which comprises a photoelectric conversion unit and an amplifying unit which amplifies an output of the photoelectric conversion unit and outputs a pixel signal;
   a plurality of column signal lines which are provided for each one column of the plurality of pixel units and in which the pixel signals from the amplifying units are output to each of a plurality of rows;
   a plurality of column circuits which are provided for each column and process signals from the column signal lines;
   a switching unit which switches connection between the plurality of the column signal lines for each one column and the corresponding column circuit for each one column based on an input signal; and a mode control unit which outputs signals to the switching unit and controls switching between a first mode in which the plurality of the column signal lines are connected to the column circuits on the same column thereof and a second mode in which one of the plurality of the column signal lines for each one column is connected to the column circuit on another column.

2. The solid-state imaging device according to claim 1, wherein the first mode is a mode in which the signals from all of the pixel units are input to the column circuits, and the second mode is a mode in which the signals from the pixel units are thinned out in the unit of the plurality of the columns and input to the column circuits.

3. The solid-state imaging device according to claim 2, wherein the switching unit connects one of the column signal lines disposed on a column of a read pixel to the column circuit disposed on a column of a non-read pixel at the time of the second mode.

4. The solid-state imaging device according to claim 1 further comprising a horizontal scanning unit which sequentially reads a signal from the column circuit, wherein the horizontal scanning unit performs the same operation in both the first mode and the second mode.

5. The solid-state imaging device according to claim 1 further comprising a horizontal scanning unit which sequentially reads a signal from the column circuit, wherein the horizontal scanning unit performs an operation in the first mode which is different from the operation in the second mode.

6. The solid-state imaging device according to claim 1, wherein the pixel units comprise a selection switch which switches connection with a plurality of vertical signal lines, and connect a control line which controls the selection switch to the pixel units of the plurality of rows.

* * * * *